Sept. 26, 1933.                C. A. MICHEL                1,928,112
                              LENS ASSEMBLY
                           Filed Dec. 21, 1929

Inventor
Clarence A. Michel
By Blackmore, Spencer & Flint
Attorneys

Patented Sept. 26, 1933

1,928,112

UNITED STATES PATENT OFFICE 1,928,112

LENS ASSEMBLY

Clarence A. Michel, Lakewood, Ohio, assignor to Guide Lamp Corporation, Anderson, Ind., a corporation of Delaware Application December 21, 1929
Serial No. 415,727

5 Claims. (Cl. 240—41.5)

This invention relates generally to lamps and more particularly to an automobile headlight lamp.

The object of the invention is the improvement of the structure of the glass door or lens and the manner of securing it to the reflector and lamp housing. With this object in view, the invention consists essentially in constructing the glass door or lens of such diameter that it extends beyond the usual packing ring or gasket and providing such extended portion with an annular flange adapted to be received in an annular offset portion formed in the open end of the lamp housing. The lens so formed is secured to the lamp housing by merely the use of two or more screws in contrast to the usual manner of employing clamping rings.

An additional feature of my invention consists in the provision of suitable means to conceal the packing ring or gasket and adjacent parts of the end of the lamp housing, which in one embodiment comprises the mirroring of the inside surface of the lens adjacent the edges thereof, or the use of a piece of thin metal on said surface, and in another embodiment comprises a metal covering over the edges of the lens which serves additionally to conceal the attaching screws.

It will be readily seen that the manner of attaching the lens to the reflector or lamp housing is of the most simple character, and that the provision of means to conceal what would otherwise be considered as unsightly parts renders the assembly attractive in appearance.

Two embodiments of my invention are disclosed in the accompanying drawing, it being understood that certain changes or modifications may be made therein within the scope of my invention as set forth in the claims.

Figure 1:
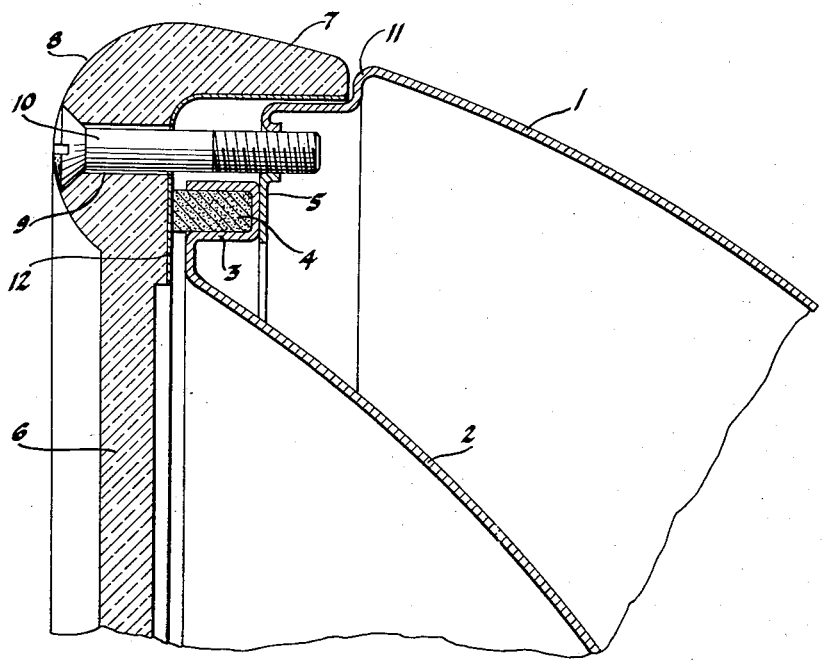
Figure 1 is a detail sectional view taken through the lens, reflector, lamp housing and an attaching element.
Figure 2:
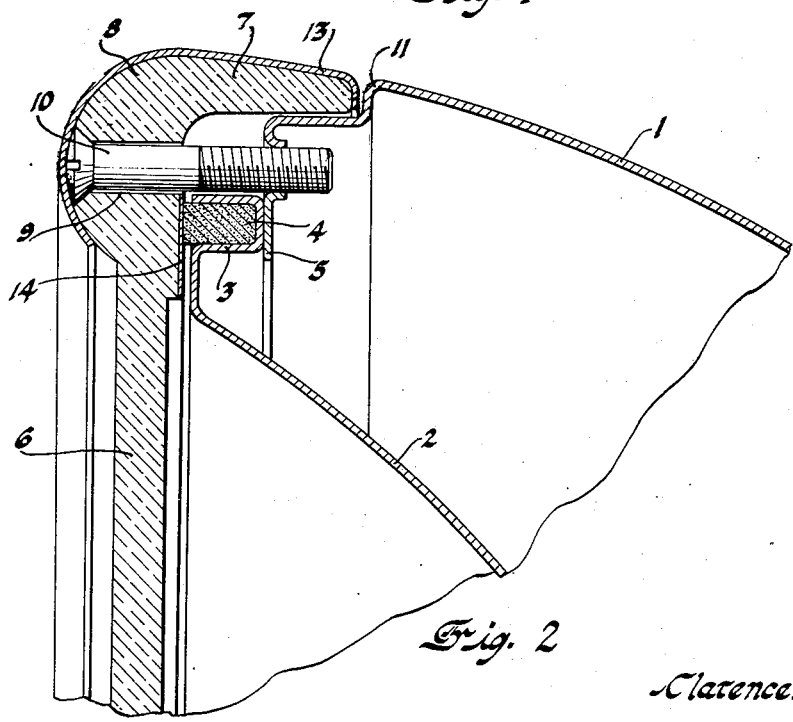
Figure 2 is a similar view showing a modification of the concealing means employed.

In Figures 1 and 2, the glass door or lens body and the attaching means for securing the same to the lamp housing are similarly formed. Referring then to both such figures, there is shown a lamp housing 1 provided with a reflector 2, which may be an integral part of the lamp housing or formed separately therefrom and positioned with respect thereto by any suitable means. Preferably the reflector 2 is formed as a separate element, and the attaching means for securing the lens to the lamp housing serves additionally to hold the reflector in place with respect to said housing, the reflector being intermediately positioned between the lens and housing. The reflector is provided with an outwardly extending annular flange which is formed with an annular recess or groove 3 in which seats the packing ring or gasket 4, of any suitable material. As shown in the drawing, the bottom wall of this groove is adapted to be positioned in abutting relation to an inwardly extending flange 5 formed on the lamp housing. The glass door or lens 6 is adapted to rest upon the packing ring or gasket 4 and be tightly drawn into engagement therewith by suitable means to be described fully hereafter.

The glass door or lens 6 is provided with a central portion which may be either clear glass or formed with special diffusing surfaces. The edge of this central portion is provided with a rim portion having an annular flange 7, the inner surface thereof being angular and the outer surface substantially bulged outwardly and rounded as at 8. Adjacent the annular flange the rim portion 8 is provided with two or more openings 9 arranged at right angles to the pane of the lens front and equally spaced around the rim portion, adapted to receive attaching screws 10 having countersunk heads. These screws 10 have threaded engagement in openings in the lamp housing flange 5 passing outside and adjacent to the packing ring or gasket 4. The flange 5 is provided with an offset adjacent the main body portion of the lamp housing which forms therein an annular shoulder 11 adapted to receive and position the extremity of the lens flange 7. It is to be noted that the contour of the outer surface of the flange 7 conforms substantially to that of the body portion of the lamp housing with which it joins to present practically an uninterrupted smooth exterior surface. As will be apparent, the screws 10 function to secure the lens tightly against the gasket 4 and the reflector 2 to the lamp housing 1. Any suitable interengaging elements may be provided to position the reflector properly with respect to the lamp housing, such as, for instance, providing turned portions on the flange 5 to engage the inner wall of the reflector groove 3, or providing bent out portions on said groove passing through openings in the housing flange 5.

It will be noted that in the structure thus far disclosed the gasket 4, flange 5 and adjacent parts would be visible through the glass door or lens which would be unsightly. To obviate this objection, I have shown in Figure 1 the inner surface of the lens as being mirrored at the rim portion, as at 12, the extent thereof being as indicated. Instead of mirroring this portion, a piece of thin metal of the same extent, finished suitably to compare with the lamp housing, may be inserted. In either event, there would be provided a means to conceal the reflector groove and gasket and the housing flange and offset portion.

In the embodiment shown in Figure 2, I have provided a metal covering 13, which may be suitably finished and serves to additionally conceal the portion of the attaching screws positioned in the lens. This metal covering 13 does not function in any manner as a clamping ring and may be applied in any manner about the outer curved surface of the rim portion of the lens subsequent to the securing of the lens to to the clamp housing by the screws 10. The metal covering 13 may be employed with or without the mirrored surface such as shown in Figure 1. The advantage in the use of the metal covering is that of appearance largely in that such covering may be finished to correspond with the finish of the lamp housing, or if desired, finished in some contrasting effect relative thereto. Noting Figure 2, if such metal covering were extended inwardly so as to completely conceal the gasket, it would interfere with light diffusion through the lens and for that reason it is desirable to terminate the inner edge as indicated. Then, if desired, the inner surface of the rim portion may be mirrored or a piece of thin metal inserted, as at 14, between the lens and gasket to completely conceal the latter, but for this purpose need not be of the extent of the means shown in Figure 1.

Instead of either of the preceding methods of concealing the gasket and adjacent elements, resort might be had to painting either the inner or outer surface of the rim portion of the lens.

I claim:

1. In a lamp, the combination with a lamp housing, of an annular gasket, a lens provided with a rim portion extending beyond the gasket, means to secure said lens to said housing which does not entirely conceal said gasket, and a surface of said rim portion being mirrored to conceal said gasket which would otherwise be visible through the rim portion of said lens.

2. In a lamp, the combination with a lamp housing, of a reflector, a gasket mounted in said reflector, a lens engaging said gasket, screws passing through said lens and engaging said housing for securing the lens tightly against the gasket, and means to conceal the gasket, screws and portions of the housing which would otherwise be visible through said lens.

3. In a lamp, the combination of a lamp housing provided with an inwardly extending flange joining the body portion thereof in an annular offset, a reflector engaging said flange, a groove in said reflector and a gasket seated in said groove, a lens extending beyond the gasket and provided with an annular flange positioned in said offset, means securing said lens to the flange on the housing, and additional means so constructed and positioned as to conceal the gasket, housing flange and offset therein.

4. In a lamp, the combination of a lamp housing provided with an annular offset at the open end thereof, a lens provided with an annular exteriorly rounded flange positioned within said offset, means securing said lens to said housing, and a metal covering closely fitting the outer surface of said flange and concealing said securing means.

5. In a lamp, the combination of a lamp housing provided with an annular offset at the open end thereof, a lens provided with an integral annular rearwardly extending flange positioned within said offset, the portion of said lens adjacent said flange being of greater thickness than the central portion thereof, and attaching means passing through said portion of greater thickness and engaging said lamp housing to secure the lens thereto.

CLARENCE A. MICHEL.